AUTOMATIC GAIN CONTROL FOR MAGNETIC SOUND RECORDERS

Filed July 26, 1963 2 Sheets-Sheet 1

Inventors:
Adolf Wohlrab
and Günther Zwenig
by: Michael S. Striker
Attorney

Inventors
Adolf Wohlrab
and Günther Zwenig
by Michael S. Striker
Attorney

United States Patent Office 3,340,368
Patented Sept. 5, 1967

3,340,368
AUTOMATIC GAIN CONTROL FOR MAGNETIC SOUND RECORDERS

Adolf Wohlrab, Furth, Bavaria, and Günther Zwenig, Nurnberg, Germany, assignors to Max Grundig, Furth, Bavaria, Germany Filed July 26, 1963, Ser. No. 297,859
Claims priority, application Germany, Sept. 14, 1962, G 35,920
6 Claims. (Cl. 179—100.2)

ABSTRACT OF THE DISCLOSURE

The output voltage of a three-stage magnetic sound recorder amplifier is compared to a reference voltage. An error signal is generated if the output voltage is greater than the voltage corresponding to saturation of the record carrier. The error voltage charges a capacitor through a cathode follower and the capacitor signal is used to change the gain of the first stage to zero the error voltage. An additional resistor to reduce the time constant for speech recording and a second resistor to increase the time constant when starting the recorder are provided.

The present invention concerns a magnetic sound recorder with automatic gain control of the recording amplifier.

In carrying out magnetic sound recordings it is important that the low frequency current passing through the recording head has an amplitude which during recording the loudest (highest volume) portions of the sound sequence to be recorded results in magnetic saturation of the record carrier. If this predetermined amplitude is exceeded non-linear distortions take place. On the other hand, if this predetermined amplitude is not reached, then the available energy is not fully exploited in the process and also the distance of the recording from the noise level is reduced.

In order to enable the operator to pre-adjust as best as possible and to control during the recording the amplification ratio or gain of the amplifier, conventional magnetic sound recorders are usually equipped with a volume indicator (pointer instrument, cathode ray indicator, glow lamp or the like) so that continuously a voltage proportional to the recording current is indicated. Then the operator may adjust by means of a variable resistor the gain of the recording amplifier in such a manner that the current passing through the recording head in fact reaches the value for magnetic saturation of the record carrier during the loudest passages of the sound sequence being recorded.

Other conventional arrangements have been also found to be unsatisfactory in various respects as will be explained further below.

It is therefore one object of this invention to provide for an automatic gain control in magnetic sound recorders which is free of the disadvantages and inconveniences of conventional arrangements.

It is a further object of this invention to provide for an arrangement as mentioned above which is comparatively simple in structure and entirely reliable in operation.

With above objects in view the invention includes in a magnetic sound recorder having multistage input signal amplifier means feeding a recording head, an automatic gain control arrangement comprising, in combination, sampling means for deriving from the output of said multistage amplifier means a variable voltage proportional to the amplitude of the current passing from said amplifier means to said recording head; comparator means for comparing said variable voltage with a substantially constant predetermined reference voltage and for furnishing a control voltage depending upon any existing voltage difference between said variable voltage and said reference voltage; and retroactive regulating means controlled by said control voltage and tending to reduce said voltage difference to zero by regulating the gain of that portion of said multistage amplifier means which carries out an initial partial amplification of the input signal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

In order to illustrate the advancement of the art entailed by the present invention first two typical arrangements of the prior art will be described.

Figure 1:
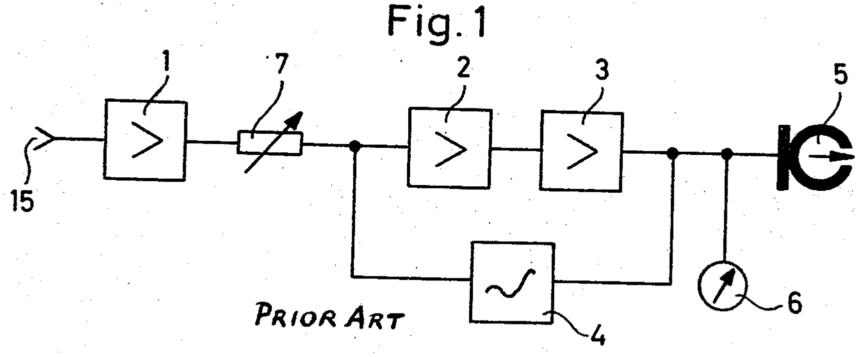
FIG. 1 is a block diagram illustrating one type of conventional gain control arrangement of a magnetic sound recorder.

FIG. 1 is a block diagram of a conventional three-stage recording amplifier with manual gain control. The signal to be recorded is received at the input 15 and is applied to the first amplifier stage 1. Between this first stage and the following second amplifier stage 2 a variable resistor 7 is arranged for adjusting the gain of the amplifier arrangement. The first amplifier stage 1 has a linear frequency-dependent characteristic, but the output of the third amplifier stage 3 is connected with the input of the amplifier stage 2 by means of a frequency-dependent negative feedback circuit 4 in order to produce the required frequency-dependent characteristic of the current passing through the recording head 5. A volume indicator 6 shows the value of a variable voltage proportional to the recording current passing through the recording head 5.

This very popular arrangement entails for the operator the considerable inconvenience that he as a rule must continuously observe the volume indicator 6 and that he is bound to adjust the variable resitsor 7 very cautiously and sensitively while trying to follow the indications of the indicator 6. However, if in the tone sequence being recorded unexpectedly a fortissimo occurs one has to expect that the gain adjusted by hand will not be the proper one so that the signal is overamplified. Since a re-adjustment by hand cannot be carried out with sufficient rapidity at least the start of the fortissimo passage will be severely disturbed by the effect of the non-linear distortion factor of the record carrier.

Figure 2:
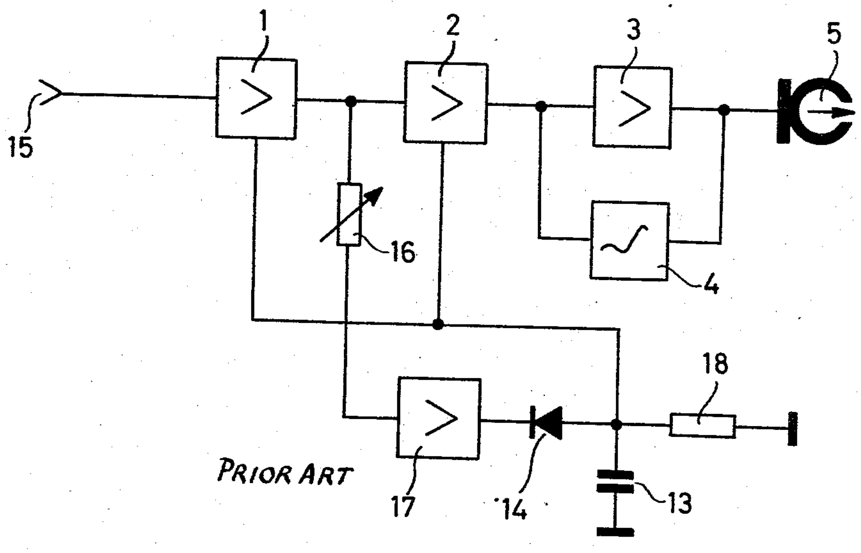
FIG. 2 is a block diagram illustrating a more elaborate type of conventional gain control arrangement for magnetic sound recorders.

The prior art knows another arrangement which is illustrated by FIG. 2 and which avoids the drawbacks of the above described known arrangement. In this case the signal passes on its way between the input terminal 15 and the recording head 5 through a three-stage amplifier comprising two amplifier stages 1 and 2 equipped with frequency-independent automatic gain control, and one amplifier stage 3 which is not so controlled. The stage 3 is shunted by a frequency-dependent negative feedback circuit 4 and thereby produces the required frequency-dependent characteristic for the current passing through the recording head 5. At a junction point between the stages 1 and 2 a portion of the signal voltage is tapped and applied via a variable resistor 16 to an additional amplifier stage 17 with automatic gain control. The output voltage of this amplifier stage 17 charges a delay capacitor 13 via a rectifier 14. The negative direct current voltage appearing at the delay capacitor 13 is applied to the amplifier stages 1 and 2 as the regulating voltage. If the variable resistor 16 is suitably adjusted the regulating voltage causes the output voltage of the amplifier stage 2 to remain essentially independent of the value of the input signal voltage appearing at the input terminal 15 and thus to remain constant for a predetermined, practically sufficient range of the input voltage.

The delay capacitor 13 is charged in the case of recording the loudest passages of the sound sequence to a negative potential which is sufficient for producing the required gain control for the particular sound volume. The charging time of the delay capacitor 13 is so small (about 200 msec.) that the distortions by overamplification which unavoidably occur during the regulating process cannot be observed by the listener. It will be understood that there are in parallel with the delay capacitor 13 certain unavoidable leakage resistances (e.g. the blocking resistance of the rectifier 14, the leakage resistances of the amplifier stages 1 and 2) which are jointly represented for the purpose of illustration by a resistor 18. These resistances or the resistor 18 permits a slow discharge of the delay capacitor 13 so that after the recording of a loud passage the amplification increases until the output voltage of the amplifier stage 17 exceeds the potential present at the delay capacitor 13 so that now the later is again charged.

While the known arrangement according to FIG. 2 avoids the disadvantages and drawbacks of the arrangement according to FIG. 1 with manual gain control, even the arrangement according to FIG. 2 entails other and very substatial disadvantages.

After the variable resitsor 16 has been adjusted all gain variations occurring in the amplifier stages 2 and 3 are not subject to correction by the gain control according to FIG. 2. To the contrary, such gain variations in the stages 2 and 3 are bound to affect the current passing through the recording head 5. If the frequency spectrum of the signal i.e. its statistical amplitude distribution over the frequency band is not inverse relative to the frequency-dependent correction but e.g. contains more high frequency than are permissible after the frequency-dependent correction, then again an excessive amplification of the signal to be recorded takes place which leads to linear and non-linear distortions and finally to the formation of beat frequencies.

Since the delay circuit composed of the delay capacitor 13 and the resistor 18 has a relatively small time constant amounting to about 40 seconds, the amplification of rather long piano passages will increase noticeably during the recording thereof so that the actual volume variations of the recorded piece will be considerably falsified.

The arrangement according to FIG. 2 cannot be started but with maximum amplification gain at the beginning of the recording because at the start the delay capacitor 13 is completely discharged. Consequently, each recording will be started with maximum amplification even if the particular piece starts with a piano passage.

The arrangement according to the invention avoids and overcomes all these difficulties and disadvantages.

Figure 3:
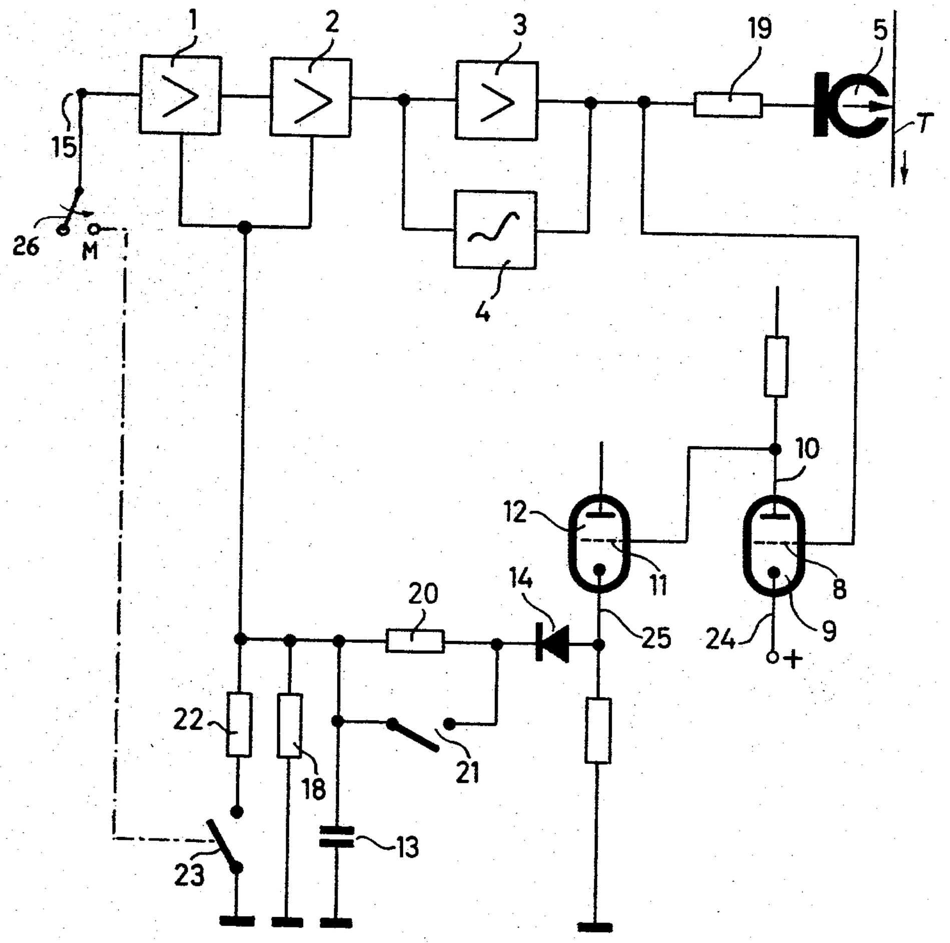
FIG. 3 is a block diagram illustrating a gain control arrangement according to the invention.

An embodiment of the invention is illustrated by way of example by the block diagram of FIG. 3.

The signal to be recorded passes on its way from the input terminal 15 to the recording head 5 three amplifier stages 1, 2 and 3. The amplifier stages 1 and 2 are equipped with frequency-independent automatic gain control while the not so regulated amplifier stage 3 is shunted by a frequency-dependent negative feedback circuit 4 so that it produces in well known manner the required frequency-dependent correction of the current passing through the recording head 5.

The output voltage furnished by the amplifier stage 3 and being proportional to the recording current is taken to a tube 9 the cathode 24 of which is connected with a source of constant or at least substantially constant positive direct current voltage which constitutes a predetermined reference voltage. The anode 10 of the tube 9 is connected with the grid 11 of a second tube 12 for transmitting alternating voltage thereto. The tube 12 is connected in a well known manner to function as a cathode follower. The cathode 25 of the tube 12 is connected with a rectifier 14 through which the delay capacitor 13 can be charged by the output of tube 12 either directly provided that the switch 21 is in closed position or via the resistor 20. The unavoidable leakage resistances of the delay capacitor 13 are again illustrated by the resistor 18 in a manner similar to that employed in FIG. 2.

By suitably selecting the reference voltage applied to the cathode 24 of the tube 9 and by properly selecting the value of the series resistor 19 between amplifier 3 and recording head 5 the tube 9 will remain non-conductive as long as the current passing through the recording head 5 does not reach a value which would cause magnetic saturation of the record carrier T.

As soon as, however, this current amplitude is exceeded the tube 9 is rendered conductive by the voltage applied to its grid 8 and, in turn, causes the tube 12 to furnish a voltage which charges the delay capacitor 13 until by the charge potential of this capacitor the gain control devices of the stages 1 and 2 cause the output signal from stage 3 to return to, or even drop below, that value which causes magnetic saturation of the record carrier T. In other words, the tube 24 becomes conductive when any existing difference between the variable voltage proportional to the recording current, on one hand, and the reference voltage at cathode 24, on the other hand, appears at tube 8. If this is the case the automatic gain control takes place with the tendency of reducing the above mentioned voltage difference to zero. Or stated in other words: up to the moment when the amplification furnishes a current which causes saturation of the record carrier the recording current remains proportional to the input voltage. If however, the input voltage further increases within a practically necessary range then the recording current remains at a constant volume irrespective of the frequency.

It can be seen that with the aid of this arrangement according to the invention it is avoided that the maximum permissible amplitude of the recording current is exceeded, regardless of the frequency spectrum or the statistical amplitude distribution in the signal to be recorded.

Also, it can be seen that the arrangement according to the invention also regulates amplitude variations that may be caused by amplification changes occurring in the individual amplifier stages during operation, in the same manner as in the initially described case the operator would have to carry out gain corrections manually depending upon the indication of the volume indicator.

When musical performances are to be recorded it is of great importance to have available in the delay circuit of the arrangement a suitably large time constant so that in the case of a long lasting piano passage the actual gain can be maintained for a substantial period of time. It has been found by practical experiments that the time constant should amount to at least 150 seconds. Since for obvious reasons the leakage resistances represented by the resistor 18 cannot be increased to any arbitrary high value, the desired large time constant can only be obtanied by using a capacitor having a correspondingly large capacitance. On the other hand, in order to be able to recharge such a large capacitor in a sufficiently short time, e.g. about 200 msec., the arrangement according to the invention provides the tube 12 in cathode follower connection because in this case no voltage amplification takes place but because the internal resistance is very low. By providing a large time constant for the delay circuit 13, 18 the amplification during recording of music will not increase or hardly audibly increase even in the case of comparatively long piano passages.

However, if speech is to be recorded with the aid of a microphone connected to the input terminal 15 then it is desirable to reduce this time constant of the delay arrangement to about 40 seconds because in this case e.g. the effect of different microphone distances of different speakers is more rapidly compensated which results in a much better recording. For this purpose an auxiliary resistor 22 is provided which is arranged to be connected in parallel with resistor 18 i.e. in circuit with the capacitor 13 when the auxiliary switch 23 is moved to the closed position. Consequently, in the case of recording speech the switch 23 may be closed so that now the delay capacitor 13 is able to discharge more rapidly and thus the time constant of the delay circuit is reduced. Since in certain portable sound recorders microphone reception is used almost exclusively for speed recordings, it would be convienient and advisable to mechanically connect or couple the switch 23 with the conventional input selector switch 26, as indicated by a dash-dotted line, so that when the selector switch 26 is placed in position engaging the contact M assigned or connected to the microphone, not shown, the switch 23 is simultaneously moved to closed position.

In order to make it possible that also the start of the recording of a sound performance is started with the correct volume or signal amplitude it is contemplated according to the invention that e.g. by actuating a special push-button switch the recording amplifiers are switched on before the actual recording is started, i.e. before the record carrier T is started to move. Under these circumstances the amplifier and automatic gain control arrangement may, upon receiving some trial signal, adjust itself to the correct or at least approximately correct gain. However, it would be desirable to prevent an incorrect gain adjustment in response to impulse-type spurious signals of short duration e.g. the noise produced by placing a pickup device in operative position. For this purpose a further resistor 20 may be inserted between the delay capacitor 13 and the rectifier 14 together with another switch 21 so arranged that it would shunt the resistor 20 when in closed position. Of course, the switch 21 would have to remain in closed position during regular recording. However during the above described preparatory steps before the start of the recording the switch 21 would be in open position so that now the resistor 20 increases the charging time of the capacitor 13 to about 1 second so that the charge potential of the delay capacitor 13 would not be changed noticeably even in the case of the occurrence of brief spurious impulses of considerable volume. Most conveniently the closing of the switch 21 is effected by actuation of the same control element by which the record carrier T is moved into engagement with the recording head 5 and is started to move, e.g. a start push-button switch.

It will be understood that each of the elements described above, or two or more together, may also find a useful application in other types of an automatic gain control arrangement for a magnetic sound recorder differing from the types described above.

While the invention has been illustrated and described as embodied in an automatic gain control arrangement for a magnetic sound recorder having multistage input signal amplifier means feeding a recording head, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a magnetic sound recorder having multistage input signal amplifier means feeding a recording head, an automatic gain control arrangement comprising, in combination, sampling means for deriving from the output of said multistage amplifier means a variable voltage proportional to the amplitude of the current passing from said amplifier means to said recording head; comparator means for comparing said variable voltage with a substantially constant predetermined reference voltage and for furnishing a control voltage depending upon any existing voltage difference between said variable voltage and said reference voltage; and retroactive regulating means controlled by said control voltage and tending to reduce said voltage difference to zero by regulating the gain of that portion of said multistage amplifier means which carries out an initial partial amplification of the input signal, said regulating means including capactive delay means for extending the regulating action thereof over a predetermined period of time after said control voltage has assumed a predetermined value, said delay means including resistor and capacitor means determining a charging time constant below 200 msec. and a discharge time constant of at least 150 sec.

2. In a magnetic sound recorder having multistage input signal amplifier means feeding a recording head, an automatic gain control arrangement comprising, in combination, sampling means for deriving from the output of said multistage amplifier means a variable voltage proportional to the amplitude of the current passing from said amplifier means to said recording head; comparator means for comparing said variable voltage with a substantially constant predetermined reference voltage and for furnishing a control voltage depending upon any existing voltage difference between said variable voltage and said reference voltage; and retroactive regulating means controlled by said control voltage and tending to reduce said voltage difference to zero by regulating the gain of that portion of said multistage amplifier means which carries out an initial partial amplification of the input signal, said regulating means including capacitive delay means for extending the regulating action thereof over a predetermined period of time after said control voltage has assumed a predetermined value, said delay means including resistor and capacitor means determining a charging time constant below 200 msec. and a discharge time constant of at least 150 sec., and auxiliary means for temporarily changing said discharge time constant to at least 20 sec. and not exceeding 50 sec.

3. In a magnetic sound recorder having multistage input signal amplifier means feeding a recording head, an automatic gain control arrangement comprising, in combination, sampling means for deriving from the output of said multistage amplifier means a variable voltage proportional to the ampltitude of the current passing from said amplifier means to said recording head; comparator means for comparing said variable voltage with a substantially constant predetermined reference voltage and for furnishing a control voltage depending upon any existing voltage difference between said variable voltage and said reference voltage; and retroactive regulating means controlled by said control voltage and tending to reduce said voltage difference to zero by regulating the gain of that portion of said multistage amplifier means which carries out an initial partial amplification of the input signal, said regulating means including capacitive delay means for extending the regulating action thereof over a predetermined period of time after said control voltage has assumed a predetermined value, said delay means including resistor and capacitor means determining a charging time constant below 200 msec. and a discharge time constant of at least 150 sec., and auxiliary means for temporarily changing said discharge time constant to at least 20 sec. and not exceeding 50 sec., said auxiliary means including second resistor means and auxiliary switch means for placing said second resistor means in circuit with said capacitor means whenever desired.

4. An arrangement as claimed in claim 3, wherein a selector input switch is operatively connected with said multistage amplifier means and mechanically connected with said auxiliary switch means for joint operation of both said switch means.

5. An arrangement as claimed in claim 1, wherein an input switch is provided in connection with said multistage amplifier means for placing the latter and said automatic gain control arrangement in operative condition before the start of a recording operation.

6. An arrangement as claimed in claim 5, including an additional resistor in series with said capacitor means for increasing said charging time constant to a value of the order of 1 second, and switch means for shunting said additional resistor during recording operations.

References Cited

UNITED STATES PATENTS

| | | | |
|---|---|---|---|
| 2,656,422 | 10/1953 | Loper | 328—168 X |
| 2,866,018 | 12/1958 | Bell | 330—9 |
| 3,070,786 | 12/1962 | MacIntyre | 330—9 X |
| 3,105,230 | 9/1963 | MacIntyre | 330—9 X |
| 3,207,998 | 9/1965 | Corney et al. | 330—9 X |
| 3,242,269 | 3/1966 | Pettengill | 179—100.2 |

BERNARD KONICK, *Primary Examiner.*

J. BREIMAYER, *Assistant Examiner.*